US009992852B2

(12) United States Patent
Kurt et al.

(10) Patent No.: US 9,992,852 B2
(45) Date of Patent: Jun. 5, 2018

(54) LIGHTING DEVICE

(71) Applicant: PHILIPS LIGHTING HOLDING B.V., Eindhoven (NL)

(72) Inventors: Ralph Kurt, Eindhoven (NL); Wiebe Wagemans, Eindhoven (NL); Dragan Sekulovski, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/550,937

(22) PCT Filed: Feb. 12, 2016

(86) PCT No.: PCT/EP2016/052993
§ 371 (c)(1),
(2) Date: Aug. 14, 2017

(87) PCT Pub. No.: WO2016/131714
PCT Pub. Date: Aug. 25, 2016

(65) Prior Publication Data
US 2018/0027637 A1    Jan. 25, 2018

(30) Foreign Application Priority Data

Feb. 17, 2015 (EP) .................................... 15155305

(51) Int. Cl.
*H05B 37/02* (2006.01)
*H05B 33/08* (2006.01)
*G09F 13/02* (2006.01)

(52) U.S. Cl.
CPC ..... *H05B 37/0281* (2013.01); *H05B 33/0872* (2013.01); *G09F 13/02* (2013.01)

(58) Field of Classification Search
CPC ............ H05B 33/0815; H05B 33/0818; H05B 33/0884; H05B 33/0809; H05B 33/0848;
(Continued)

(56) References Cited

U.S. PATENT DOCUMENTS 4,611,889 A * 9/1986 Buzak ...................... H04N 9/20
                                                              348/742
8,193,713 B2 * 6/2012 Jung ....................... H05B 35/00
                                                              315/158
(Continued)

FOREIGN PATENT DOCUMENTS

DE         10055297 A1    5/2002
DE       102005059492 A1    6/2007
(Continued)

Primary Examiner — Douglas W Owens
Assistant Examiner — Syed M Kaiser

(57) ABSTRACT

The present invention relates to a lighting device for illuminating a target object with the objective to draw a person's attention to this target object. It alternatingly provides a relatively fast dynamic light output component and a relatively slow dynamic light output component, the former being predominantly for triggering a person's attention towards a target object, while the latter is mainly for enhancing the visual appearance of the target object, thereby keeping someone's attention for that object. For this purpose, the lighting device is arranged to provide a primary light output alternatingly comprising a first light output component and a second light output component. The lighting device comprises a switching controller for switching between the first light output component and the second light output component after a time interval. The primary light output has a perceived light intensity that remains constant over time within a margin of 10%. Each of the first and second light output components is characterized by a light output characteristic. The light output characteristic for the first light output component varies over time according to a first waveform, and the light output characteristic for the second light output component varies over time according to a second waveform. Each of the first and second waveforms is characterized by a time constant. The time constant has a first value for the first waveform and a second value for the (Continued)

second waveform, the first value being lower than the second value. The time interval for switching between the first and second light output components is between 0.1 seconds and 30 seconds.

13 Claims, 8 Drawing Sheets

(58) Field of Classification Search
 CPC ............ H05B 33/0896; H05B 37/0245; H05B 37/0254; H05B 37/0281; H05B 33/0872; H05B 33/0803; H05B 37/0272; H05B 33/0857; H05B 33/0887
 USPC ........ 315/159, 391, 161, 209, 210, 224, 307
 See application file for complete search history.

(56) References Cited

U.S. PATENT DOCUMENTS

| | | | | |
|---|---|---|---|---|
| 9,693,414 B2* | 6/2017 | Maxik | ............... | H05B 33/0857 |
| 2006/0237636 A1 | 10/2006 | Lyons et al. | | |
| 2007/0159422 A1* | 7/2007 | Blandino | ............ | A01M 1/2033 345/82 |
| 2009/0122317 A1* | 5/2009 | Ito | ............... | G01J 3/02 356/440 |
| 2010/0085728 A1* | 4/2010 | Seto | ................... | C09K 11/0883 362/84 |
| 2011/0147566 A1* | 6/2011 | Furuya | ...................... | G02F 1/37 250/205 |
| 2012/0155899 A1* | 6/2012 | Watanabe | ........... | G03G 15/5058 399/49 |
| 2013/0215597 A1* | 8/2013 | Davis | ........................ | F21V 7/22 362/84 |
| 2013/0229662 A1* | 9/2013 | Ogawa | ................. | G01M 11/331 356/453 |
| 2013/0259749 A1* | 10/2013 | Moretti | ................ | G01N 21/783 422/85 |
| 2015/0054415 A1* | 2/2015 | Maxik | .................. | H05B 33/086 315/192 |
| 2016/0193478 A1* | 7/2016 | Maxik | ..................... | F21K 9/232 362/231 |
| 2016/0295178 A1* | 10/2016 | Damberg | ............. | G03H 1/2294 |
| 2017/0332450 A1* | 11/2017 | Blum | ................ | H05B 33/0815 |

FOREIGN PATENT DOCUMENTS

| | | |
|---|---|---|
| EP | 0450426 A1 | 10/1991 |
| WO | 2008139364 A1 | 11/2008 |
| WO | 2010131170 A1 | 11/2010 |

* cited by examiner (a)

(b)

LIGHTING DEVICE

CROSS-REFERENCE TO PRIOR APPLICATIONS

This application is the U.S. National Phase application under 35 U.S.C. § 371 of International Application No. PCT/EP2016/052993, filed on Feb. 12, 2016 which claims the benefit of EUROPEAN Patent Application No. 15155305.4, filed on Feb. 17, 2015. These applications are hereby incorporated by reference herein.

FIELD OF THE INVENTION

The invention relates to a lighting device for illuminating a target object with the objective to draw attention to this target object.

BACKGROUND OF THE INVENTION

In many everyday situations, drawing a person's attention to an object is desirable, or it may even be essential. For example, a retailer wants to draw the attention of possible customers to the goods that he is selling. Furthermore, when people are participating in traffic their attention should be drawn to traffic signs.

Lighting can be used to draw attention, for example in the form of blinking and/or color changing illumination, which may collectively be referred to as "dynamic lighting" or "dynamic illumination".

WO-2008/139364 discloses a light system for use in a clothing rack. This system is configured to be switched from a so-called "flirting mode" (dynamic light) for attracting a person's attention, into a so-called "serve mode" (functional static light). In the "flirting mode" the light system provides pulsating light in the form of a ramped or saw tooth light output.

Another example of dynamic lighting is disclosed in DE-102005059492, in the form of a lighting device for use in the field of advertising to draw the attention of an observer. This lighting device has one or more LEDs that are controlled by a driver circuit, and it is arranged to provide a first pulse sequence consisting of several strong light pulses with a short intermediate time period in between, the intermediate time period being equal to the pulse duration. After a certain time period, a second pulse sequence is provided having a different pulse frequency than the first pulse sequence.

The object of the invention is to provide a lighting device according to the opening paragraph, which increases the attractiveness and acceptability of dynamic lighting in order to better engage people.

SUMMARY OF THE INVENTION

The inventors have found that monotonous repetition of a dynamic (e.g. pulsating) light effect at constant frequency very quickly results in discomfort, annoyance and reduced attractiveness of the target object.

Furthermore, the inventors have realized that with the known light systems the person whose attention has been attracted and who has been prompted to approach a target object, may rapidly loose his attention, or may even fail to recall to what object his attention was drawn in the first place. For example, the light system of WO-2008/139364 switches from a dynamic light output (i.e. the flirting mode) to a static light output (i.e. the serve mode) triggered by detecting the presence of a human being. In other words, after someone's attention has been drawn for a target object (represented by the detection of a person), the system switches from flirting to serve mode, thereby removing the effect that resulted in the actual attraction of attention (this effect being the dynamic light output).

Based on the aforementioned insights, the object of the invention has been achieved by a lighting device for providing a primary light output alternatingly comprising a first light output component and a second light output component. The primary light output has a perceived light intensity that remains constant over time within a margin of 10%. Each of the first and second light output components is characterized by a primary light output characteristic. The primary light output characteristic for the first light output component varies over time according to a first waveform, and the primary light output characteristic for the second light output component varies over time according to a second waveform. Each of the first and second waveforms is characterized by a time constant. The time constant has a first value for the first waveform and a second value for the second waveform, the first value being lower than the second value. The lighting device further comprises a switching controller for switching between the first light output component and the second light output component after a time interval. The time interval for switching between the first and second light output components is between 0.1 seconds and 30 seconds.

In operation, the lighting device of the present invention alternatingly provides a relatively fast dynamic light output component (being the first light output component) and a relatively slow dynamic light output component (being the second light output component), while the primary light output does not show on-off blinking behavior because the perceived light intensity of the primary light output remains constant over time within a margin of 10%, such as within a margin of 5%, within a margin of 2%, or even within a margin of 1%.

The term "perceived light intensity" refers to the light intensity perceived by the average human observer. Perceived light intensity is considered constant over time if the light intensity is not changed over time or if any changes in the light intensity are above the flicker fusion threshold, which is defined as the frequency at which an intermittent light stimulus appears to be completely steady to the average human observer, such as a frequency of 100 Hz. For instance pulse width modulation of light as known in the art typically operating at frequencies of one kHz or higher would still be considered as having a perceived light intensity that is constant over time.

The relatively fast dynamic light output component is predominantly for triggering a person's attention towards a target object, while the relatively slow dynamic light output component is mainly for enhancing the visual appearance of the target object, thereby keeping someone's attention for that object.

The dynamic behaviour of the two light output components is characterized by the same type of primary light output characteristic. In the context of the present invention, a light output characteristic is a parameter that characterizes the light output. Examples of light output characteristics are color, color rendering index, and R9 color rendering value. In this context, the term "color" refers to a point in the CIE 1976 (L*a*b*) color space, wherein dimension L* relates to lightness, reflecting the subjective brightness perception of a color for humans along a lightness-darkness axis, and dimensions a* and b* relate to chromaticity. It is noted that the aforementioned definition of the term "color" covers characteristics such as light intensity, color point, correlated color temperature, hue, colorfulness, chroma, and saturation.

In the lighting device of the invention, there is at least one light output characteristic (not being the perceived light intensity) that is time-dependent for both the first and the second light output component according to a waveform, which may have any shape, such as a pulsed wave, a sinusoidal wave, a sigmoidal wave (i.e. a waveform wherein the amplitude changes according to an S-curve), a triangle wave, or a sawtooth wave. This particular light output characteristic is labeled as the "primary light output characteristic".

Each of the waveforms of the first and second light output components can be characterized by the same type of time constant. In the context of the present invention, a time constant is a parameter that characterizes the time-dependency of a light output. Examples of time constants are the time between subsequent pulses, the pulse width at half maximum, and the amount of change per time unit.

The type of time constant that is chosen to characterize the time-dependency of the primary light output characteristic in the first light output component should also be used to characterize the primary time-dependency of the same light output characteristic in the second light output component. The chosen type of time constant has a first value in relation to the first waveform, and a second value in relation to the second waveform, the first value being lower than the second value. The first and second values of the chosen time constant may be different by at least a factor of two, such as by a factor between 3 and 5, or by a factor of 10.

For the first light output component, the time constant may have a first value that is so short that the temporal variation of the primary light output characteristic will be hardly noticeable in a human being's direct vision. For example, the first light output component may comprise light pulses with a frequency between 30 Hz and 70 Hz, such as between 40 Hz and 60 Hz. In that frequency range a human being can notice the changing light output only subliminally, or only in his peripheral vision and not in his direct vision.

The time interval for switching between the first and second light output components is between 0.1 seconds and 30 seconds, such as between 0.5 seconds and 10 seconds, or even between 1 second and 5 seconds.

In the lighting device of the present invention, the switching controller determines when the device switches between the first and second light output components, and it may have the additional functionality of varying the primary light output characteristic for the first and second light output components.

Switching between the first and second light output components may either occur directly, or via an intermediate light output component. For such an optional intermediate light output component, the primary light output characteristic may also be time-dependent with a certain time constant, but it may also be a light output component that does not change as a function of time.

The actual transition between the first and second light output components may either be instantaneous or smooth. Regarding the latter, typical transition curves can be sinusoidal or sigmoidal (i.e. via an S-shaped curve). The transition time may for example be at least 100 milliseconds, or at least 200 milliseconds.

To ensure a smooth transition when switching from one light output component to a subsequent light component, the primary light output characteristic may be identical for both components at the moment of switching.

The inventors found out that dynamically changing the time constants further increases attractiveness while keeping attention high and preventing or limiting discomfort and annoyance.

The first and second light output components may each be further characterized by a secondary light output characteristic. For example, the primary light output characteristic may be color rendering index while the secondary light output characteristic is color point. The color rendering index for the first and second light output components is varying over time according to a first and second waveform, respectively, while the color point remains constant within a margin of 10 SDCM, preferably within 5 SDCM, or even within 2 SDCM. The term "SDCM" refers to the standard deviation of color matching. Compared to a certain color point in the chromaticity diagram, those color points that have an equal color difference from this particular color point are located on an ellipse, wherein the scale of such an ellipse is expressed in a number of SDCM.

The lighting device of the invention can be an interactive lighting device, wherein the time dependency is for example triggered by the presence of a person. The time dependency can also be linked to a sensor for measuring the distance of a person from the target object and for changing the time dependency of the light effect. For example, the second mode can be used if a person is at a certain distance from the target object in order to attract his attention, while gradually changing to the first mode if the person comes closer to the target object to increase attractiveness.

The lighting device of the invention can be used for advertisement. It can be a shelf light or a spot light for illuminating products in a retail environment such as a supermarket or a shop. It can be part of a refrigerator or a freezer to increase attention to soft drinks and ice cream to seduce a person into buying such products.

The lighting device of the invention can be used to illuminate products or product packages, but also to illuminate advertisement media such as stickers, labels, posters, poster boxes, and billboards.

The time dependency of the lighting device can be linked to other advertisement media, such as to a typical sound effect or melody used in a TV or a radio commercial. Moreover, online advertisement could be linked in this way to this "on the product advertisement".

The time dependency of the lighting device can also be linked and/or synchronized with another multisensory trigger such as a sound or tactile trigger, for example the beat of music that a person listens to on a portable device such as a smart phone. Also, a handheld device such as a mobile phone or a bar code scanner can vibrate with the same beat in a synchronized way.

The lighting device can be further improved by taking the ambient lighting conditions into account. Ambient light, such as background or environmental light, can (partly) illuminate the target object and/or other objects in the vicinity of the target object. The perceived threshold for visibility as well as annoyance depends on the overall light intensity, mainly on the absolute level of ambient light but also on the ratio between the output of the lighting device and the ambient light. In an embodiment, the lighting device comprises a controller to adjust the time constants of the light output to optimize the overall effect depending on the ambient light. The controller may be operated manually, by selecting from a number of presets, or the lighting device may comprise an ambient light sensor for providing a control signal to the controller for automatic adjustment (again via presets).

BRIEF DESCRIPTION OF THE DRAWINGS

Examples of the invention will now be described in detail with reference to the accompanying drawings, in which.

It should be noted that these figures are diagrammatic and not drawn to scale. For the sake of clarity and convenience, relative dimensions and proportions of parts of these figures may have been shown exaggerated or reduced in size.

DETAILED DESCRIPTION OF THE EMBODIMENTS

Figure 1:
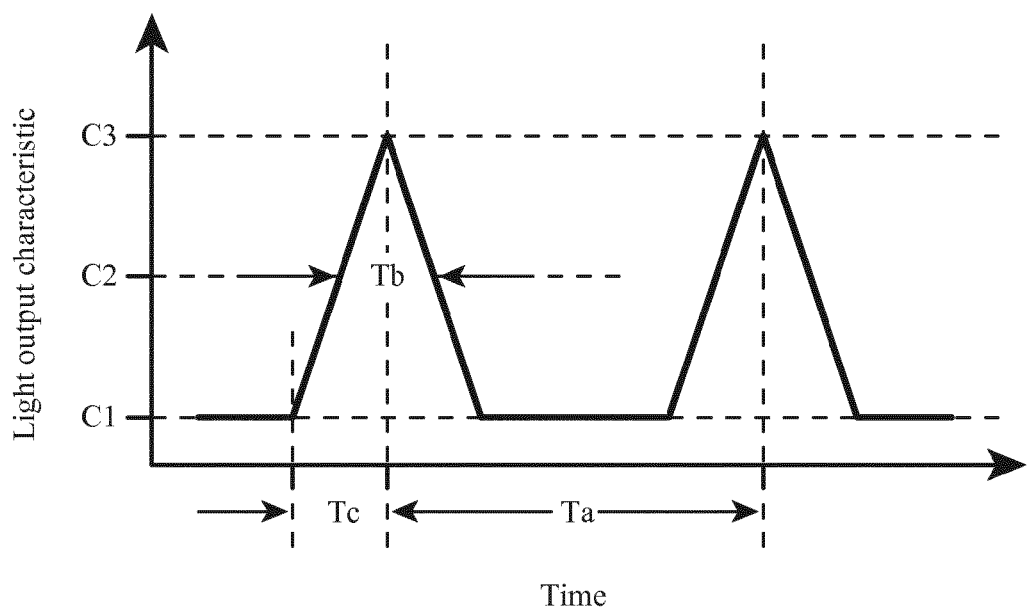
FIG. 1 illustrates several different examples of time constants that can be used to characterize waveforms of a light output component.

FIG. 1 illustrates several different examples of time constants that can each be used to characterize the waveforms of the first and second light output components. The examples shown are the time between subsequent pulses (Ta), the pulse width at half maximum (Tb), and the amount of change per time unit ([C3−C1]/Tc).

Figure 2:
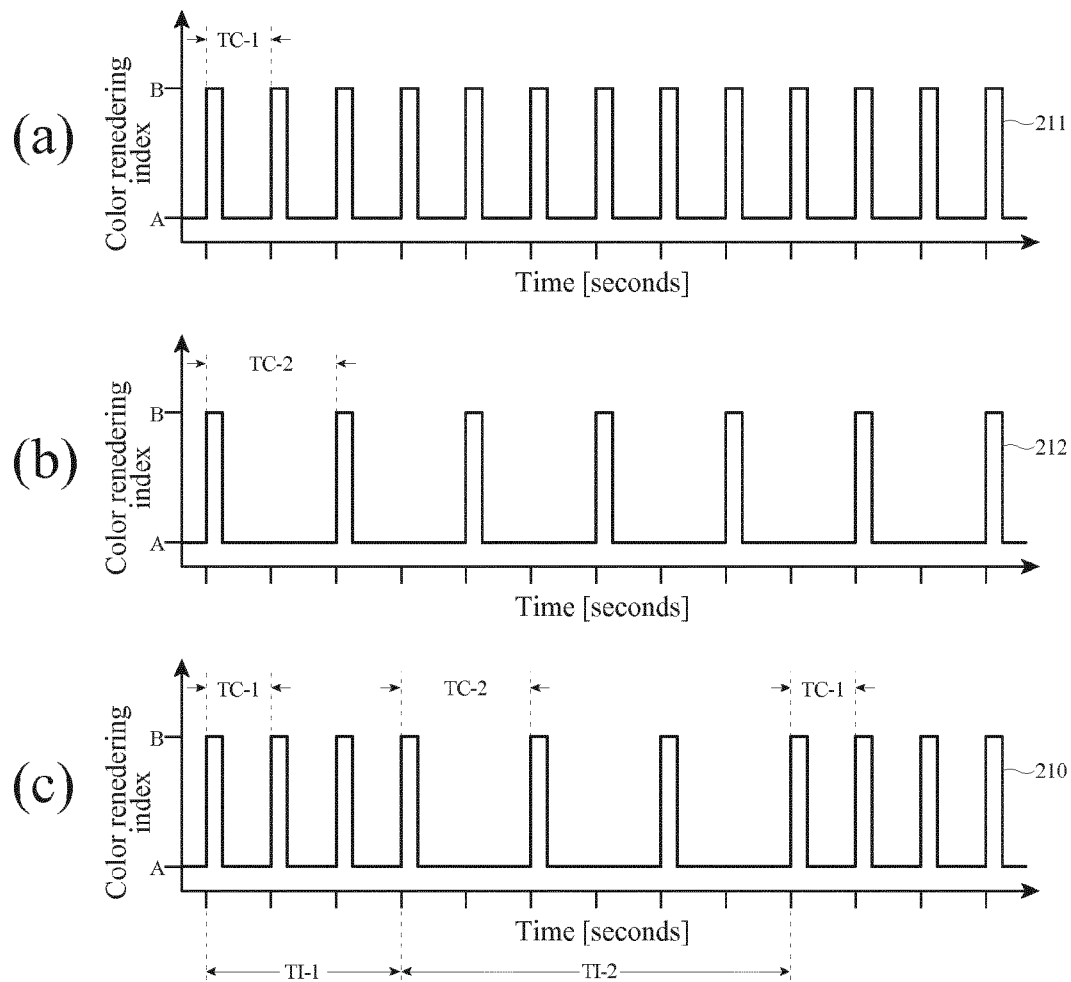
FIGS. 2(a) to 2(c) show the time-dependent light output of the first light output component, the second light output component, and the primary light output, respectively, for a first embodiment of the lighting device according to the present invention.

For an embodiment of the lighting device according to the present invention, FIG. 2 shows the time-dependent light output of the first light output component (see FIG. 2(a)), the second light output component (see FIG. 2(b)), and the primary light output (see FIG. 2(c)).

In this embodiment the primary light output characteristic is the color rendering index, which varies over time for the first light output component according to the first waveform 211, and for the second light output component according to the second waveform 212. The first waveform 211 and the second waveform 212 are both pulsed waves consisting of a sequence of pulses, wherein each pulse has the same duration.

In the embodiment of FIG. 2, the time constant chosen to characterize the two waveforms is the time between two subsequent pulses. For the first waveform 211, this time constant has the first value TC-1, which is equal to one second, and for the second waveform 212 it has the second value TC-2, which is equal to two seconds. In other words, the first value of the time constant is lower than the second value of the time constant.

The primary light output as characterized by the waveform 210 is obtained by directly switching between the first and second light output components. The first light output component is maintained for a time interval TI-1, which is equal to three seconds, and the second light output component for a time interval TI-2, which is equal to six seconds. In other words, the time interval for switching from the first light output component to the second light output component is three seconds, while the time interval for switching from the second light output component to the first light output component is six seconds, both being in the range of 0.1 seconds to 30 seconds.

The waveforms shown in FIG. 2 are pulsed waves representing a sequence of bursts of different color rendering index. Obviously, instead of color rendering index as example of a primary light output characteristic, other primary light output characteristics may also be chosen.

Figure 3:
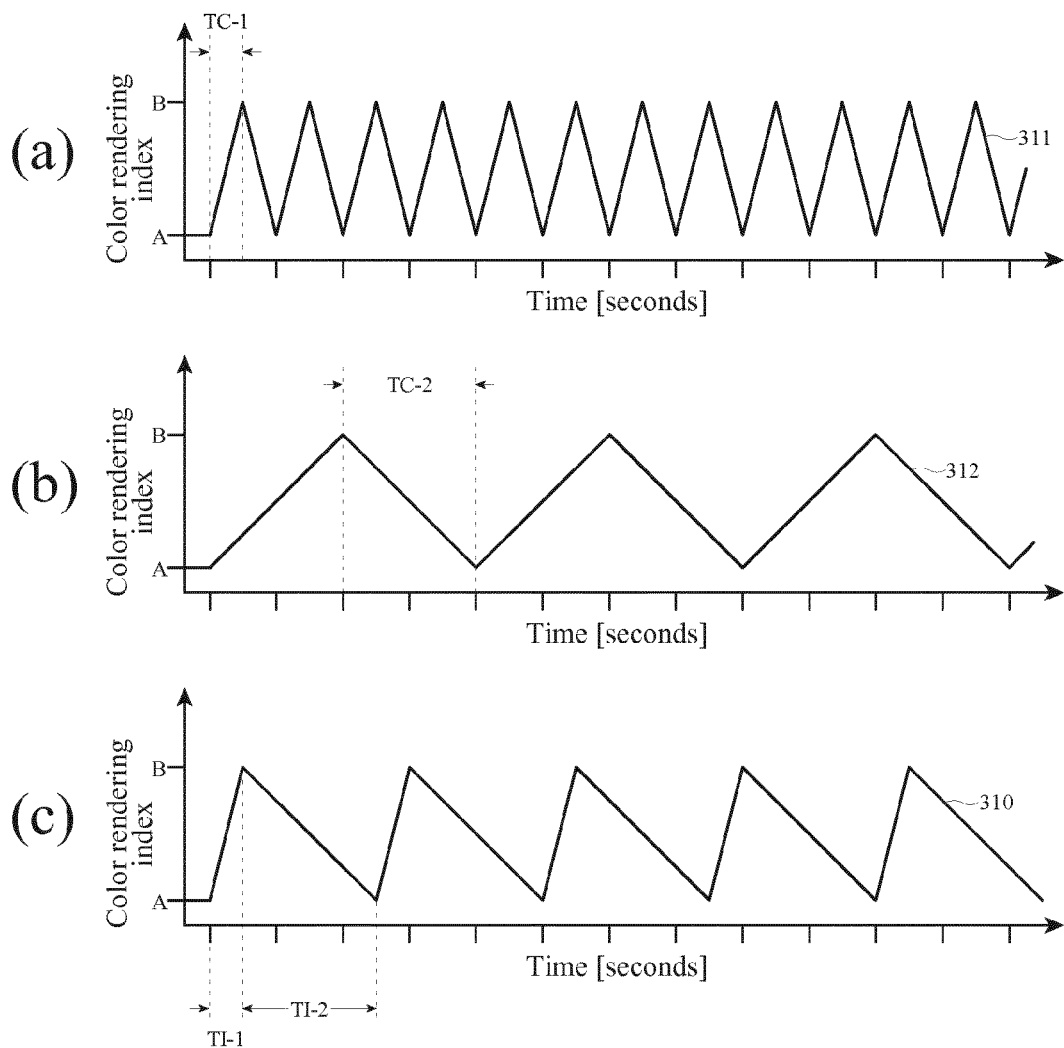
FIGS. 3(a) to 3(c) show the time-dependent light output of the first light output component, the second light output component, and the primary light output, respectively, for a second embodiment of the lighting device according to the present invention.

For another embodiment of the lighting device according to the present invention, FIG. 3 shows the time-dependent light output of the first light output component (see FIG. 3(a)), the second light output component (see FIG. 3(b)), and the primary light output (see FIG. 3(c)).

Again, the primary light output characteristic is the color rendering index, which varies over time for the first light output component according to the first waveform 311, and for the second light output component according to the second waveform 312. In this case, the first waveform 311 and the second waveform 312 are both triangle waves.

In the embodiment of FIG. 3, the time constant that is chosen to characterize each of the two waveforms is the time between the lowest and highest intensity values. For the first waveform 311, this time constant has the first value TC-1, which is equal to 0.5 second, and for the second waveform 312 it has the second value TC-2, which is equal to two seconds. In other words, the first value of the time constant is lower than the second value of the time constant.

The primary light output as characterized by the waveform 310 is obtained by directly switching between the first and second light output components. The first light output component is maintained for a time interval TI-1, which is equal to 0.5 seconds, and the second light output component for a time interval TI-2, which in this example is equal to three seconds. In other words, the time interval for switching from the first light output component to the second light output component is 0.5 seconds, while the time interval for switching from the second light output component to the first light output component is three seconds, both being in the range of 0.1 seconds to 30 seconds.

Figure 4:
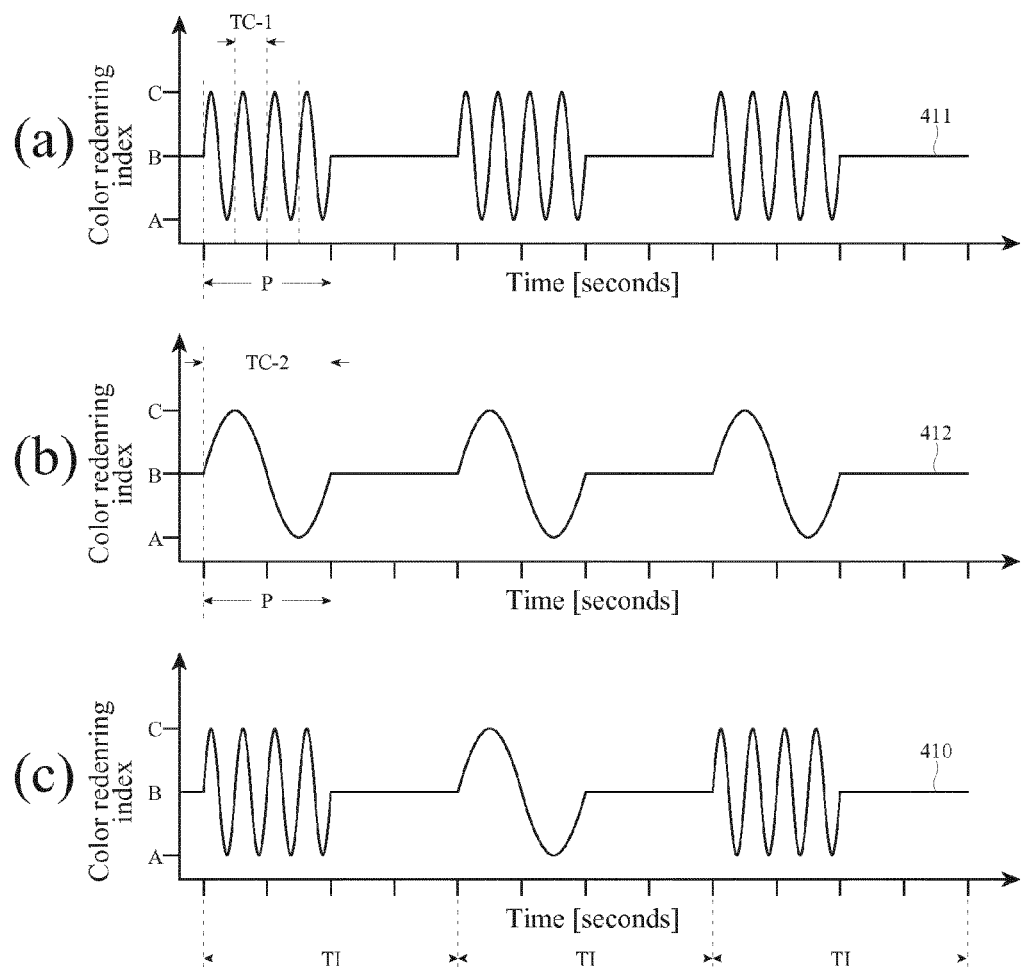
FIGS. 4(a) to 4(c) show the time-dependent light output of the first light output component, the second light output component, and the primary light output, respectively, for a third embodiment of the lighting device according to the present invention.

Similarly to FIGS. 2 and 3, FIG. 4 shows the time-dependent light output of the first light output component (waveform 411 in FIG. 4(a)), the second light output component (waveform 412 in FIG. 4(b)), and the primary light output (waveform 410 in FIG. 4(c)) for yet another embodiment of the lighting device according to the present invention.

In this embodiment the first and second light output components vary in color rendering index relative to a baseline value B according to a sinusoidal wave, wherein for both light output components the variation in color rendering index occurs within a time period P of equal length (two seconds).

In the embodiment of FIG. 4, the time constant chosen to characterize the two waveforms is the wavelength of the sinusoidal waveform. For the first light output component, the time constant is indicated with TC-1 in FIG. 4(a), and for the second light output component it is indicated with TC-2 in FIG. 4(b). Clearly, the first value of the time constant (TC-1) is lower than the second value of the time constant (TC-2).

The primary light output as characterized by the waveform 410 is obtained by directly switching between the first and second light output components, wherein each light output component is maintained during the same time interval TI, which in this example is equal to four seconds.

Figure 5:
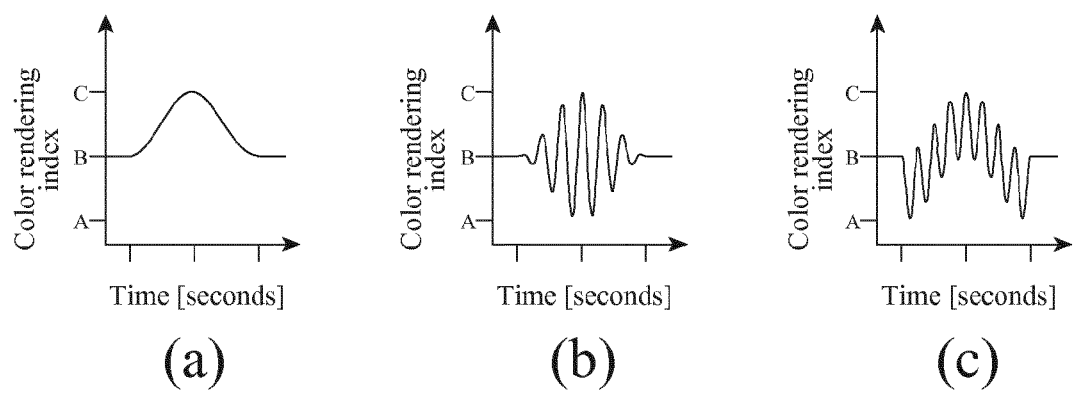
FIGS. 5(a) to 5(c) show different examples of light output components having a primary light output characteristic that varies over time.

FIGS. 4(a) and 4(b) show two examples of a light output component that varies in color rendering index relative to a baseline intensity value B during a certain time period. Further examples of a light output component that varies in intensity relative to a baseline intensity value B during a certain time period are shown in FIGS. 5(a) to 5(c).

Figure 6:
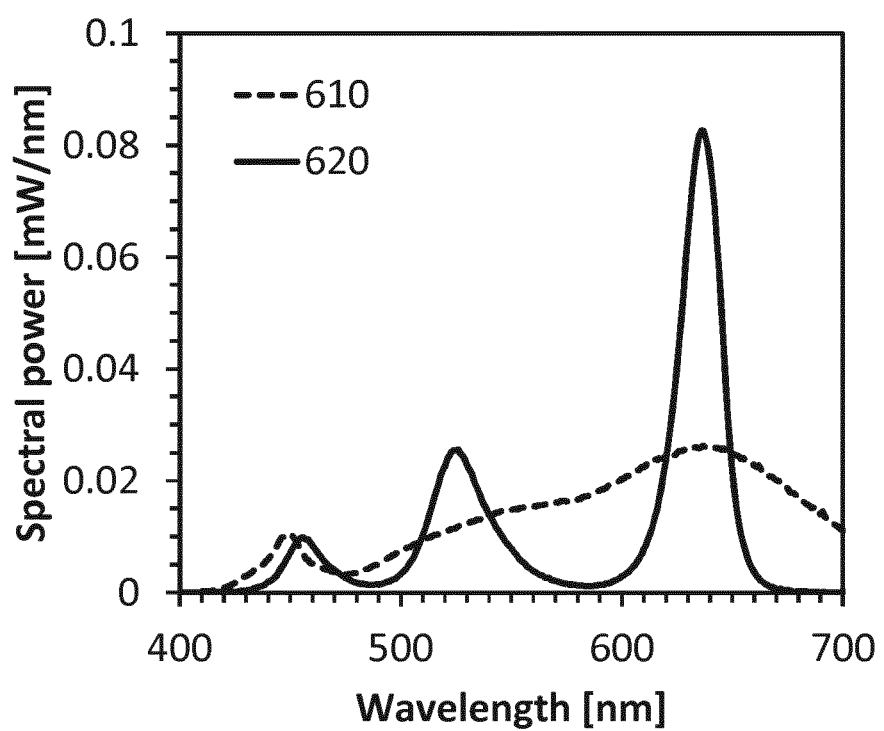
FIG. 6 shows the spectral distributions of two different pluralities of LEDs used in an embodiment of the lighting device according to the invention.

FIG. 6 relates to a further embodiment of the lighting device according to the present invention. The lighting device of this embodiment comprises a first plurality of phosphor-converted white LEDs (for example Luxeon® 3014 devices, CRI 80), and a second plurality of RGB white LEDs (for example Luxeon® 3030 devices). The first plurality of phosphor-converted white LEDs is arranged to emit light that is characterized by spectral distribution 610, and the second plurality of RGB white LEDs is arranged to emit light that is characterized by spectral distribution 620. Both spectral distributions 610 and 620 correspond to white light having a correlated color temperature of about 3,000 K, and substantially the same color rendering index. However, compared to spectral distribution 610, spectral distribution 620 is stronger in the green part of the spectrum (between about 500 and 600 nm), and particularly in the red part of the spectrum (between about 600 and 700 nm).

In operation, the lighting device of this embodiment switches between the first and second light output components 610 and 620, respectively. In other words, the lighting device switches between two light outputs that have substantially the same color rendering index and correlated color temperature, but that have different spectral output power particularly in the red part of the spectrum. Of course, the primary light output as a whole still has a perceived light intensity that remains constant over time within a margin of 10% so that the average human observer does not experience any on-off blinking behavior. FIG. 7(a) shows how the lighting device may switch between these two light outputs, wherein 710 denotes the light output of the first plurality of phosphor-converted white LEDs, and 720 that of the second plurality of RGB white LEDs. FIG. 7(b) shows the corresponding time-dependent change in red light intensity. In this Figure, after 0.5 seconds the lighting device has completely switched from the light output of the first plurality of phosphor-converted white LEDs to that of the second plurality of RGB white LEDs, and the intensity of emitted red light has increased with about a factor of three. During the next 0.5 seconds the lighting device switches back to the light output of the first plurality of phosphor-converted white LEDs, and the intensity of emitted red light decreases accordingly.

Figure 7:
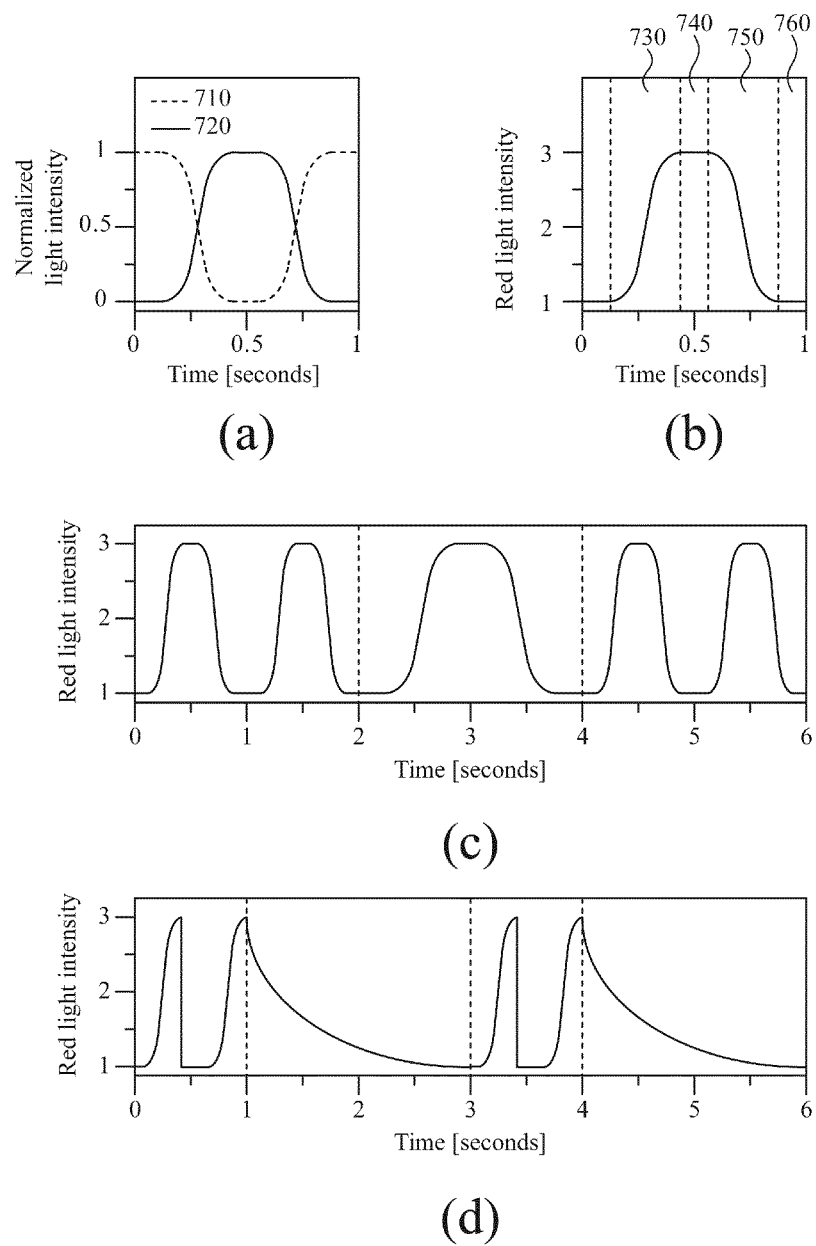
FIGS. 7(a) to 7(d) illustrate the time-dependent light output of the lighting device having the two different pluralities of LEDs as shown in FIG. 6.

It is noted that in this embodiment the primary light output characteristic is the intensity of emitted red light, and FIG. 7(b) shows the first waveform for the first light output component of the lighting device. The second waveform for the second light output component of the lighting device is not shown separately in FIG. 7, but it has a similar course as the first waveform, only with a longer time constant. The waveforms have a "transition up" part (730 in FIG. 7(b)), a "hold up" part (740 in FIG. 7(b)), a "transition down" part (750 in FIG. 7(b)), and a "hold down" part (760 in FIG. 7(b)). In this embodiment, the holding parts are the same, and the transition parts 730 and 750 are symmetrical sigmoidal transitions. In other embodiments this may be different so that the holding and/or transition parts have different characteristics.

FIG. 7(c) shows the primary light output of the lighting device, wherein every two seconds the lighting device switches from the first light output component to the second light output component, and vice versa.

FIG. 7(d) shows an alternative primary light output wherein at least the first waveform has different holding and transition parts. Dependent on the time scale used, the primary light output of FIG. 7(d) can be considered a simulation of a person's heartbeat.

Figure 8:
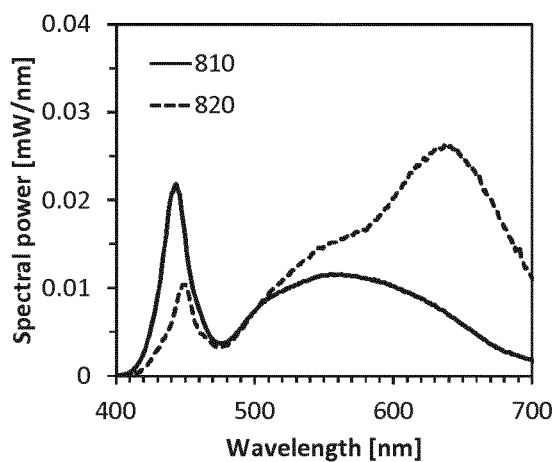
FIGS. 8(a) and (b) show spectral distributions of two different pluralities of LEDs used in embodiments of the lighting device according to the invention.
Figure 8:
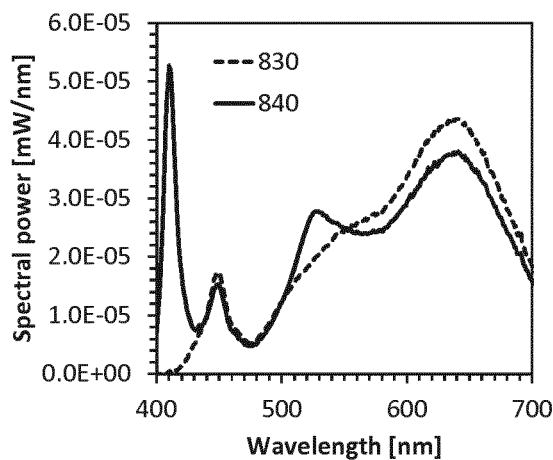

In a similar lighting device as the one that is described with reference to FIGS. 6 and 7, the two pluralities of LEDs are both phosphor-converted LEDs, but with a different correlated color temperature. This is illustrated in FIG. 8(a), wherein the first plurality of phosphor-converted white LEDs is arranged to emit light that is characterized by spectral distribution 810, and the second plurality of phosphor-converted white LEDs is arranged to emit light that is characterized by spectral distribution 820. Spectral distributions 810 and 820 correspond to white light having a correlated color temperature of about 5,600 K and about 3,000 K, respectively. In this embodiment, the primary light output characteristic is the correlated color temperature.

In operation, this lighting device switches between the first and second light output components 810 and 820, respectively. In other words, it switches between two light outputs that have a different correlated color temperature. When comparing spectral distributions 810 and 820, it is clear that when switching from spectral distribution 810 to spectral distribution 820, a color enhancement is obtained for green, yellow, orange and red colors (corresponding to wavelengths of about 520 nm and longer), while blue saturation is reduced, resulting in an enhancement of color contrast.

In yet another lighting device as the one that is described with reference to FIGS. 6 and 7, the two pluralities of LEDs are chosen such that they are both arranged to emit white light of the same correlated color temperature, while one of the pluralities of LEDs has a stronger emission in the spectral range between about 400 nm and 420 nm. This is illustrated in FIG. 8(b), wherein spectral distribution 840 has a stronger component in the spectral range between about 400 nm and 420 nm as compared to spectral distribution 830. In this embodiment, the primary light output characteristic is the intensity of light in the spectral range between about 400 nm and 425 nm.

When switching from spectral distribution 830 to spectral distribution 840, an illuminated white surface will appear more crisp, particularly if this surface is part of a material that comprises a whitening agent, such as a piece of clothing or any other fabric, enhancing the color contrast with differently colored parts of the illuminated surface.

While the invention has been illustrated and described in detail in the drawings and foregoing description, such illustration and description are to be considered illustrative or exemplary and not restrictive; the invention is not limited to the disclosed embodiments. Variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device for providing a primary light output alternatingly comprising a first light output component and a second light output component,
    wherein the primary light output has a perceived light intensity that remains constant over time within a margin of 10%,
    wherein each of the first and second light output components is characterized by a primary light output characteristic, which varies over time according to a first waveform for the first light output component, and according to a second waveform for the second light output component,
    wherein each of the first and second waveforms is characterized by a time constant, which has a first value for the first waveform and a second value for the second waveform, the first value being lower than the second value, and
    wherein the lighting device further comprises a switching controller for switching between the first light output component and the second light output component after a time interval that is between 0.1 seconds and 30 seconds.

2. The lighting device according to claim 1, wherein the first and second values of the time constant are different by at least a factor of two.

3. The lighting device according to claim 1, wherein the time interval for switching between the first and second light output components is between 0.5 seconds and 10 seconds.

4. The lighting device according to claim 1, wherein the switching controller is arranged to vary the primary light output characteristic for the first and second light output components.

5. The lighting device according to claim 1, wherein the switching controller is arranged to switch between the first and second light output components via an intermediate light output component.

6. The lighting device according to claim 1, wherein the switching controller is arranged to switch from one light output component to a subsequent light output component at a moment of switching such that the primary light output characteristic is identical for both components at the moment of switching.

7. The lighting device according to claim 1, wherein the switching controller is arranged to switch from one of the first and second light output components to the other during a transition time of at least 100 milliseconds according to a sinusoidal or sigmoidal transition curve.

8. The lighting device according to claim 1, wherein the primary light output characteristic is color rendering index.

9. The lighting device according to claim 8, wherein the first and second light output components have a color point that remains constant over time within a margin of 10 SDCM.

10. The lighting device according to claim 1, wherein the switching controller is arranged to receive a presence detection signal, and wherein any of the first value of the time constant, the second value of the time constant, and the time interval for switching between the first and second light output components is dependent on the presence detection signal.

11. The lighting device according to claim 1, wherein the lighting device is for illuminating a target object in a retail environment, wherein the switching controller is arranged to receive a control signal representative of an advertisement medium linked to the target object, and wherein any of the first value of the time constant, the second value of the time constant, and the time interval for switching between the first and second light output components is dependent on the control signal.

12. The lighting device according to claim 1, wherein the switching controller is arranged to receive a sound trigger signal or a tactile trigger signal, and wherein any of the first value of the time constant, the second value of the time constant, and the time interval for switching between the first and second light output components is dependent on the sound trigger signal or the tactile trigger signal.

13. The lighting device according to claim 1, further comprising an ambient light sensor for providing a control signal to a controller for adjusting any of the first value of the time constant, the second value of the time constant, and the time interval for switching between the first and second light output components based on the ambient light level.

* * * * *